Feb. 12, 1935.　　　　G. H. MAINS　　　　1,991,056

MOLDED PRODUCT AND METHOD OF PRODUCING THE SAME

Filed Dec. 27, 1930

WITNESSES
R. S. Williams
R. E. Sattler

INVENTOR
Gerald H. Mains
BY
ATTORNEY

Patented Feb. 12, 1935

1,991,056

UNITED STATES PATENT OFFICE 1,991,056

MOLDED PRODUCT AND METHOD OF PRODUCING THE SAME

Gerald H. Mains, Murrysville, Pa., assignor to Westinghouse Electric & Manufacturing Company, a corporation of Pennsylvania Application December 27, 1930, Serial No. 505,191

7 Claims. (Cl. 154—2)

My invention relates to molded products and to methods of producing the same and more particularly to laminated materials formed entirely of composite layers of wood veneer impregnated with a heat-hardened binder, or having one or both of its outer sheets formed of a layer of wood veneer, in which neither the grain nor the color of the wood is obscured by the resin employed or by the heat of the molding operation.

The principal object of my invention is to provide a molded laminated article having one or both of the outer surfaces formed of light or natural-colored wood veneer.

Another object of my invention is to provide a sheet of wood veneer having a definite resin and volatile content which, when molded to composite articles, under heat and pressure will have a light-colored hard surface and be resistant to water and other liquids.

A further object of my invention is to provide a light-colored molded article, formed of one or more pieces of wood veneer, that shall possess the natural beauty of the wood and be resistant to moisture and have a high mechanical strength.

A still further object of my invention is to provide a process of producing laminated articles having a natural-colored surface of wood veneer which comprises impregnating sheets of wood veneer with a solution of a colorless resin, such as an aqueous solution of an urea, or an urea-thiourea resin, superimposing the impregnated sheets, as an outer surface layer or layers, upon a plurality of sheets which have been impregnated with the same or a different binder and molding the assembled material, under heat and pressure, to form the final article.

In producing laminated articles having body portions formed of laminated sheet material and outer surface sheets of wood veneer, or laminated material formed entirely of wood veneer, it has heretofore been the practice to impregnate the sheets with a phenolic condensation product, assemble a plurality of them together and mold the assembled sheets under heat and pressure. A solution of a phenolic condensation product, however, is not entirely satisfactory for the impregnation of wood veneer because the solvents for the resin do not readily penetrate into the fibres of the wood and, consequently, it is impossible to obtain thorough impregnation. Furthermore, in order to properly cure a phenolic condensation product in a reasonable time, it is necessary to heat the impregnated sheets to a comparatively high temperature, which discolors and weakens the wood. The discoloration of the wood during the molding operation, as well as the natural properties of the resin, such as its color and instability when subjected to light, has the tendency to mask and obscure the natural color and the grain of the wood, thereby rendering it unsatisfactory for decorative purposes.

I have made the discovery that sheets of wood veneer or comparatively thick sheets of wood, such as blocks, may be thoroughly impregnated or coated with a solution of urea, thiourea, or urea-thiourea resin, dried and molded without discoloring the wood or obscuring its natural color. The impregnated or coated wood or wood veneer, thus formed, may then be satisfactorily employed as the surfacing material by gluing or cementing it to a suitable body material, such as wall board, plywood, asbestos or previously formed moulded material or the impregnated and dried sheet may be assembled upon and molded directly to certain of these materials, such as wood, molded materials or asbestos board. The impregnated sheet may also be placed upon one or both surfaces of a plurality of sheets of fibrous material impregnated with the same or with a different binder capable of being hardened under heat and pressure, and the assembled structure be molded, under heat and pressure, to form a composite article.

My invention will be better understood by reference to the accompanying drawing, in which.

Figure 1:
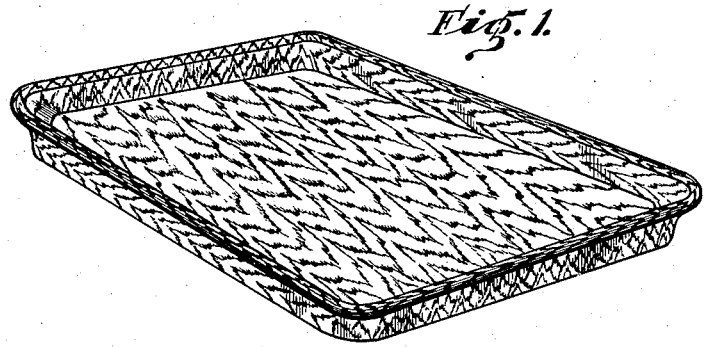
Figure 1 is a perspective view of a molded tray having an outer surface comprising sheets of wood veneer bound together by a colorless resin.

In practicing my invention, sheets or blocks of wood are immersed in an aqueous solution of an urea, a thiourea, or an urea-thiourea resin, formed, respectively, by the reaction of urea, thiourea, or a mixture of urea and thiourea with an aldehyde, such as formaldehyde. Sheets of wood veneer may be impregnated by immersing them in, or passing them, in a continuous manner, through, suitable receptacles, such as treating vats, containing a solution of the impregnating medium. The time required for this impregnation will depend upon the thickness of the material and upon the concentration and temperature of the impregnating medium. The excess resinous solution may be removed from the impregnated wood sheets, and a uniform coating provided by any convenient method, such as passing them between squeezer rolls which are maintained in the requisite spaced relation to each other. If the wooden material is in block form, or in comparatively thick sheets it may be dried immediately after the impregnating operation without removing the excess resin, although, if desired, suitable mechanical means may be provided for this purpose.

The impregnated wood is next placed in, or passed through, a suitable drying oven, such as a horizontal drying oven, for a sufficient length of time and at a sufficient temperature to reduce the volatile content to from 1% to 8%. The drying of the impregnated wood veneer may be accelerated by blowing air through the drying oven. It is necessary to control the volatile content at this stage of the process in order to provide material having the desired degree of plasticity and to prevent it from adhering to the molding plates during a subsequent molding operation. The measurement of the volatile content may be accomplished by cutting out small samples of impregnated wood and weighing the same before and after drying, the resulting loss of weight representing the volatile content of the material. I prefer to measure the volatile content at temperatures of 100° C. to 110° C. and the volatile limits, stated in the specification and some of the claims, are based upon the measurement at such temperatures.

The dried impregnated material thus produced may be cut into sheets of the desired length, and one or a plurality of layers may be molded, under heat and pressure, and then glued or cemented to molded material bound together by the same or a less expensive binding agent, or the sheets may be placed upon one or both surfaces of a plurality of sheets of a different material such as paper cloth, wood, shredded asbestos or shredded or chopped ducts, which have been impregnated with the same binder or any binder which is capable of being hardened under heat and pressure. The assembled material may then be placed in a mold and subjected to a pressure of from 1,000 to 3,000 pounds per square inch, at a temperature of from 80° C. to 140° C., for a period of time, dependent upon the thickness of the material being molded, the resin content, and the type of resin utilized in treating the body and surface materials.

The following specific examples will serve to illustrate and explain my invention. Strips of poplar wood, having a thickness of approximately 1/16 to 1/8 of an inch, were immersed in an aqueous solution of a urea-thiourea-aldehyde resin, containing from 30% to 50%, by weight, of the resin, for a period of 1 to 2 hours. After impregnation, the strips were passed between squeezer rolls to remove the excess resinous solution and were then placed in racks in an oven, which was maintained at a temperature of 80° C. to 100° C., and retained therein until their volatile content was reduced to from 1% to 8%. A plurality of the dried strips were then superimposed upon each other, and the assembled stack was placed in a molding press and subjected to a hydraulic pressure of 1,000 to 2,000 pounds per square inch, the temperature being maintained at 120° C. to 140° C., for a period of time depending upon the thickness of the assembled strips. For example, approximately 20 minutes was required to mold an assembled stack having a final molded thickness of approximately 1/4 inch. The material was cooled under pressure and removed from the molding press. Sheets of wood having distinctive grain effects, such as mahogany, may be utilized in place of poplar in the above example or merely for the surface sheets.

It will also be understood that in the foregoing example, the body portion may be formed of laminated fibrous material, such as paper or cloth impregnated with an urea, a thiourea, or an urea-thiourea resin or with another resin, such as a phenolic condensation product.

My invention is particularly adapted for impregnating comparatively thick strips or blocks of soft wood because the resin may be dissolved in water to form a solution which will readily penetrate into the fibres of the wood. For example, a block of soft wood having a thickness of from 1/4 to 1/2 inch was immersed in an aqueous solution of an urea-thiourea resin containing approximately 45% resin, by weight, until the strips or blocks were thoroughly impregnated. About 1/2 to 2 hours was sufficient for this purpose, depending upon the thickness of the strips. The treated strips or blocks of wood were then dried and molded under the conditions stated in the previous example, with the exception that approximately 1/2 hour was required for the molding of the half-inch material.

For decorative purposes, it is desirable to utilize wood having distinctive grain effects, such as walnut, mahogany or birds-eye-maple. Strips of wood or laminated plates having their exterior surfaces formed of wood veneer, are now being extensively utilized for interior decorative purposes. The appearance of such wood is considerably enhanced if the wood has a high resin content provided such resin content does not obscure the grain of the wood. My improved product is, therefore, especially desirable for such purposes. The high resin content in the wood veneer may be provided by immersing the strips of wood in a vat containing an urea-thiourea, or an urea-thiourea resin containing approximately 30% resin by weight, and drying in the manner previously described. The sheets are then reimmersed and redried to give a higher resin content, or a second coating may be applied to one side only by passing the impregnated sheet between rolls, one of which carries a solution of resin or the melted resin itself. A plurality of sheets produced in the above described manner may be superimposed upon each other or they may be applied to one or both surfaces of a plurality of sheets of less expensive veneer or of fibrous material, such as cloth or paper impregnated with the same binding agent, and the assembled sheets molded under the conditions previously mentioned; namely, 1000 to 3000 pounds per square inch pressure and at a temperature of 120° to 140° C.

A less expensive binding agent, such as a phenolic condensation product, may be employed in the above example for the impregnation of the body material, provided suitable molding conditions are provided to cure the phenolic condensation product without injuring the wood-veneer surface layers because of the high temperature and the considerable length of time required to cure the resin. For example, the body material may be subjected to a preliminary molding operation in order to practically cure the resin. After this operation, the urea-thiourea impregnated wood surface sheets may be applied, and the assembled material molded under the conditions previously stated for urea-thiourea resins.

In order to uniformly and thoroughly impregnate the wood veneer with a binding agent, it is desirable to maintain the resin content of the impregnating medium below 60%. The high viscosity of a solution containing more than 60% resin, by weight, prevents the proper impregnation of the wood, as such solutions are generally too viscous to readily penetrate the wood. High resin contents may be obtained, however, by repeatedly immersing the wood in comparatively dilute solutions of the resin, while lower resin contents may be obtained by passing the wood once through a dilute solution, or, since, highly concentrated solutions do not readily penetrate the wood, the same effect may be produced by immersing the strips or blocks of wood in a more concentrated solution.

The resin content of the impregnated wood may be controlled by varying the concentration of the impregnating medium, and the number of times the material is passed through it. While dilute solutions may be satisfactorily employed for the purposes previously stated, if the resin content is too low, the number of successive immersions required in order to provide a workable resin content is impracticable. I prefer to utilize a solution containing between 30% and 60% resin by weight.

Wood having an excessive resin content, of, say more than 70%, is brittle. Material having a resin content of less than 10% by weight, however, does not generally adhere properly during the molding operation because the laminations have the tendency to separate on removal from the molding press, and the final product has a low resistance to moisture.

The volatile content of the impregnated wood may be regulated, as desired, by varying the length of time the wood is immersed in the impregnating medium, the temperature of the drying oven, the concentration of the impregnating medium, the distance between the coating rolls, and the volume of air passed through the drying oven, or by various combinations of all or a part of these factors. It is essential to maintain the volatile content of the impregnated wood between certain definite limits because, when the impregnated wood has a volatile content of less than 1%, the resin will usually not flow properly during the first stage of the molding operation, and the final product is too dry and brittle, while, if the volatile content is more than 8%, the wood has a tendency to adhere to the platens of the molding press, and the molding operation must be extended considerably in order to properly cure the resin.

Figure 2:
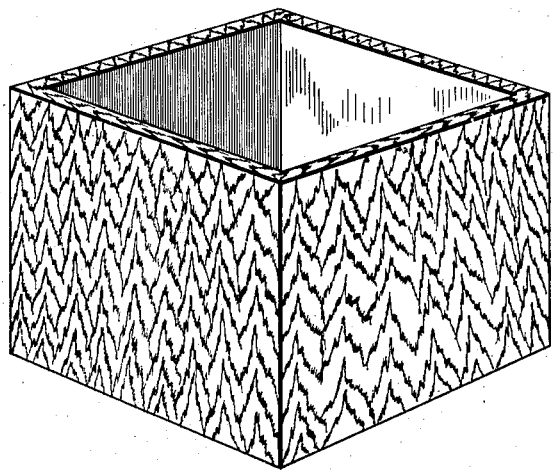
Fig. 2 is an isometric view of a container having a surface comprising wood veneer and prepared according to my improved method.

Flexible sheets of wood veneer having a supporting layer of cloth or paper or a backing such as is disclosed in my copending case, Serial No. 505,190 filed on December 27, 1930 may be impregnated with an urea, a thiourea, or an urea-thiourea resin, and a product obtained which may be molded into intricate shapes, such as trays, as shown in Fig. 1, or into containers, as shown in Fig. 2, and the grain of the wood will be preserved in its natural state. In such cases, it is often desirable to add camphor, para toluene ethyl sulphonamide, orthu toluene ethyl sulphonamide, butyl phthalate, diethyl, phthalate, or naphthalene dissolved in alcohol, benzol or acetone, or mixtures thereof, in amounts varying from 1% to 20% by weight, to the impregnating medium.

By utilizing an aqueous solution of a water-soluble resin, such as an urea-thiourea resin, wood veneer may be more thoroughly impregnated because the low viscosity of the resinous solution and the capillary force of the solvent causes the resin to penetrate more deeply and uniformly than when other impregnating mediums are utilized. Because of the relative ease of impregnating wood or wood veneer with water soluble resins thicker, and, consequently, less expensive strips of wood veneer or even blocks of wood may be utilized. Furthermore, material impregnated with an urea, a thiourea or an urea-thiourea resin may be molded in a shorter time and at a lower temperature than materials impregnated with a phenolic condensation product, and, since a colorless resin is employed which is not affected by the light, the distinctive grain effects of the wood will be preserved.

For mechanical application, a considerable saving may be effected by replacing articles now made of untreated wood by material impregnated, or impregnated and molded, by my improved method, as such articles are harder, stronger, more moisture resistant and have a longer life in service than thin wood veneer or ordinary untreated wood. Material treated by my improved method is also especially suitable for obtaining beautiful effects in the decorative field, as the naturally colored material is very appropriate for molded cases, wall panels, veneered flooring, and for the fabrication of fine furniture.

Figure 3:
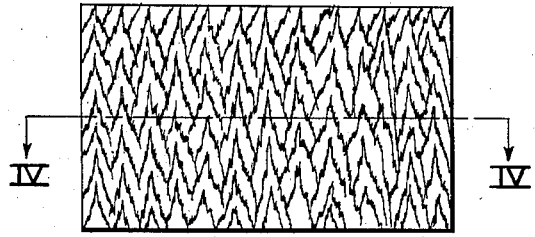
Fig. 3 is a plan view of a composite plate formed of wood veneer and fibrous sheet material.
Figure 4:
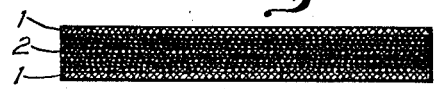
Fig. 4 is a cross-sectional view on line IV—IV of the plate shown in Fig. 3.

For example, in such cases, it is sometimes desirable to employ composite plates formed of wood veener and fibrous material as shown in Figs. 3 and 4 of the drawing. Surface sheets 1, as shown in Fig. 4 may be impregnated with a urea resin while a body portion 2, is formed of fibrous material which may be impregnated with a phenolic condensation product, and the surface layers and body portion molded together under heat and pressure to form a composite plate.

While I have disclosed my invention in considerable detail and have given specific examples, it will be understood that the examples are to be construed as illustrative and not by way of limitation. For example, suitable light-colored dyes may be added to the aqueous solution of the resin without affecting the distinctive grain effect of the wood.

Other modifications will become apparent without departing from the spirit and scope of my invention. It is, therefore, desired that only such limitations shall be imposed as are indicated in the appended claims.

I claim as my invention:

1. A laminated article comprising a body portion comprising sheets of fibrous material impregnated substantially uniformly with a phenolic condensation product and outer sheets of wood impregnated with a resin which is soluble in water in the fusible state, said outer sheets and said body portion being united together, under heat and pressure, into a composite article.

2. The process of treating sheets of wood which comprises impregnating said sheets with a solution of a urea-thiourea resin containing from 30% to 60% by weight of resin and drying until the volatile content is reduced to from 1% to 8%.

3. The process of forming a wood-veneer surfaced molded article having a relatively thick resinous coating which comprises repeatedly immersing sheets of wood veener in an aqueous solution of a mixture of an urea-thiourea resin containing from 30% to 60% resin, by weight, drying the sheets after each immersion, assembling the impregnated sheets of wood veneer upon the surface of a plurality of sheets of body material impregnated with a binding agent capable of being hardened under heat and pressure and then molding the assembled structure, under heat and pressure, to form a composite article.

4. A process of forming an improved wood-surface article so as to preserve the natural strength and beauty of the wood surface, comprising causing the fibres of sheets of wood to be penetrated with a water solution of about 30 to 60% heat-hardening resin until the wood contains about 10 to 70% of the resin, then reducing the volatile content to from about 1 to 8% and then heating under pressure of about 1000 to 3000 pounds per square inch while keeping the temperatures down to about 80° to 140° C. to enhance the natural qualities of the surface and cause the resin to flow and then harden about the wood fibres.

5. A process of forming an improved wood-surface article so as to preserve the natural strength and beauty of the wood surface, comprising causing the fibres of sheets of wood to be penetrated with a water solution of about 30 to 60% urea-thiourea resin until the wood contains about 10 to 70% of the resin, then reducing the volatile content to from about 1 to 8% to control the plasticity in molding and then heating under pressure of about 1000 to 3000 pounds per square inch while keeping the temperatures down to about 80° to 140° C. to enhance the natural qualities of the surface and cause the resin to flow and then harden about the wood fibres.

6. A process of forming an improved wood-surface article so as to preserve the natural strength and beauty of the wood surface comprising causing the fibres of sheets of wood to be penetrated with a water solution of about 45% urea-thiourea resin until the wood contains about 10 to 70% of the resin, then reducing the volatile content to from about 1 to 8% by drying at temperatures below 120° C., and molding with underlying material containing heat hardening resin, under pressure of about 1000 to 3000 pounds per square inch while keeping the temperature down to about 120° to 140° C. to enhance the natural qualities of the surface and cause the resin to flow and then harden throughout the fibres of the wood.

7. A process of forming an article having a shaped wood surface so as to preserve the natural strength and beauty of the wood surface, comprising causing the fibres of sheets of wood to be penetrated by a water solution of about 30 to 60% of a urea resin until the wood contains about 10 to 70% of the resin, then removing the water and reducing the volatile content to about 1 to 8% to control the plasticity in molding, and then shaping the sheet by bending it under pressure of about 1000 to 3000 pounds per square inch while keeping the temperature down to about 80° to 140° C., to enhance the natural qualities of the surface and to preserve the fibres from rupturing by causing the resin to flow and then harden during the molding.

GERALD H. MAINS.